No. 652,323. Patented June 26, 1900.
C. MORGAN.
COFFEE MILL.
(Application filed July 1, 1899.)
(No Model.) 2 Sheets—Sheet 1.
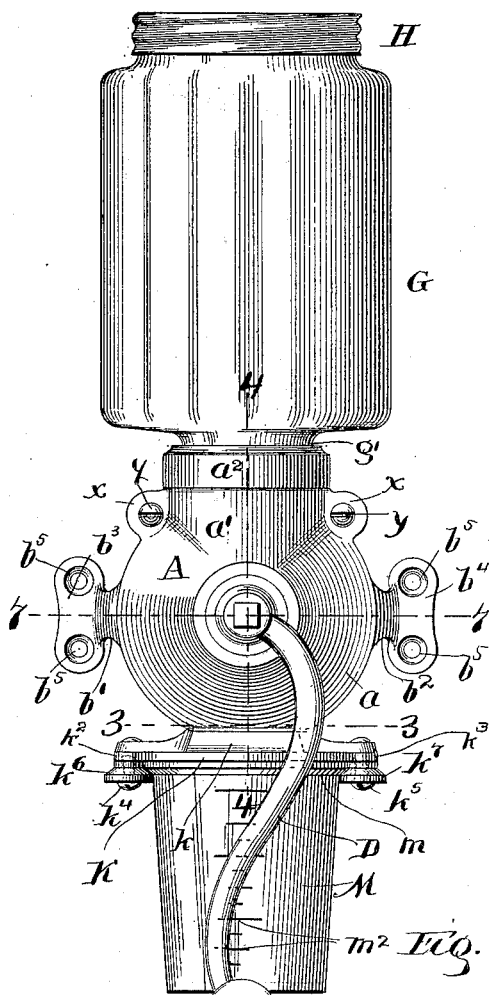
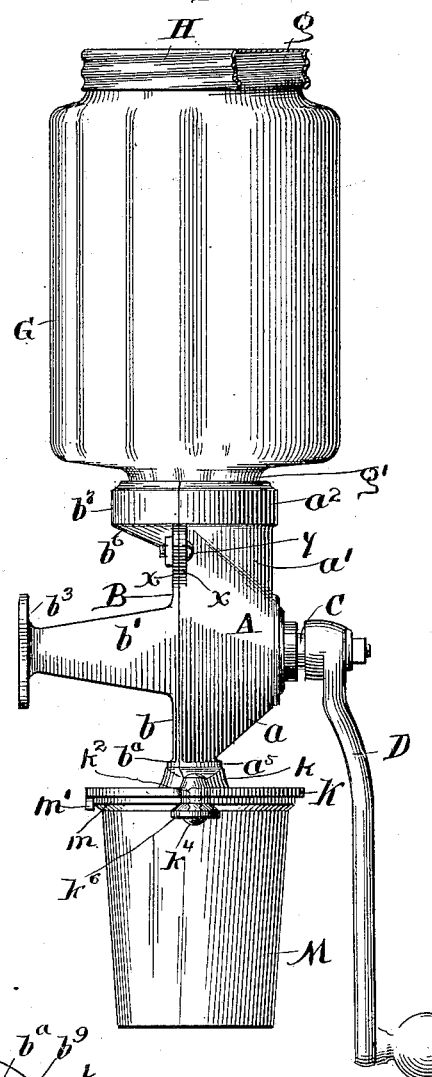
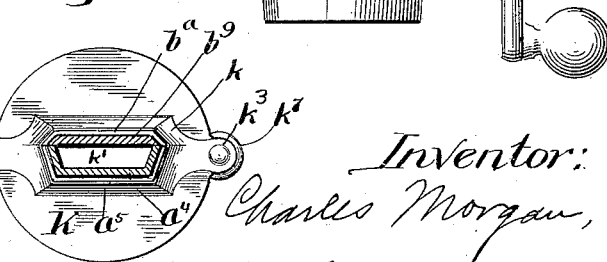

No. 652,323. Patented June 26, 1900.
C. MORGAN.
COFFEE MILL.
(Application filed July 1, 1899.)
(No Model.) 2 Sheets—Sheet 2.
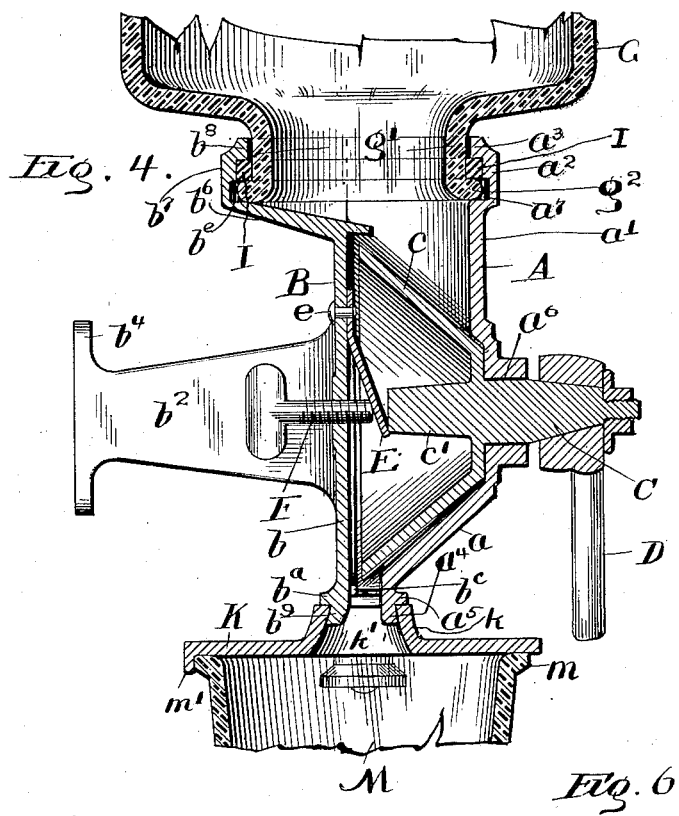
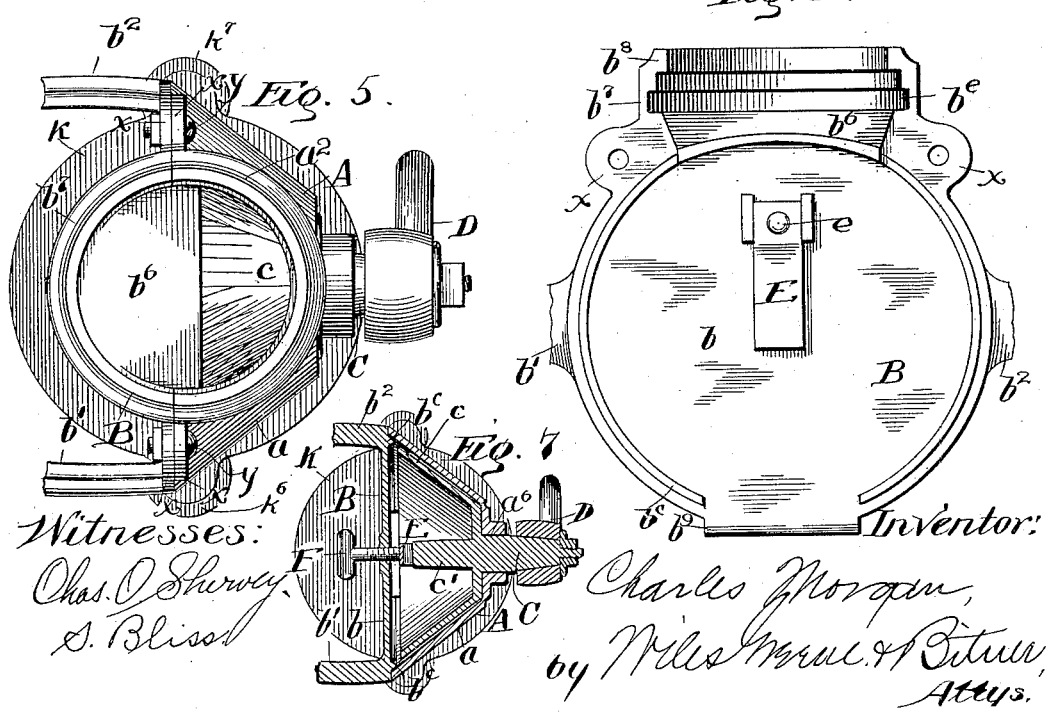
Witnesses: Chas. O. Shurvey, S. Bliss
Inventor: Charles Morgan, by Wiles, Merae & Bitner, Attys.

UNITED STATES PATENT OFFICE.

CHARLES MORGAN, OF FREEPORT, ILLINOIS.

COFFEE-MILL.

SPECIFICATION forming part of Letters Patent No. 652,323, dated June 26, 1900.

Application filed July 1, 1899. Serial No. 722,562. (No model.)

*To all whom it may concern:*

Be it known that I, CHARLES MORGAN, a citizen of the United States of America, residing at Freeport, in the county of Stephenson and State of Illinois, have invented certain new and useful Improvements in Coffee-Mills, of which the following is a specification.

My invention relates to certain improvements in coffee-mills designed for the purpose of furnishing a mill pleasing and ornamental in appearance, cheap and durable in construction, and enabling the user to tell at a glance the quantity of unground coffee and also the exact quantity of ground coffee in the different receptacles.

To such end the invention consists in certain novel characteristics, which will be fully described and claimed below.

In the drawings, Figure 1 is a front elevation of a complete mill; Fig. 2, a side elevation of the same; Fig. 3, a horizontal section looking outward from the plane 3 3 of Fig. 1; Fig. 4, a vertical section in line 4 4 of Fig. 1, drawn upon a larger scale and showing the top and bottom portions broken away. Fig. 5 is a top plan of the mill-casing. Fig. 6 is a front elevation of the rear extension of the mill-casing, and Fig. 7 is a horizontal section looking downward from the section 7 7 of Fig. 1.

Referring to the drawings, the casing of the mill is made up of two portions, preferably castings, A B. The portion B has a flat vertical center $b$, preferably circular in outline, from which extend rearwardly two legs or brackets $b'$ $b^2$, terminating in feet $b^3$ $b^4$, provided with screw-holes $b^5$, by means of which they may be securely attached to a wall or other object. The portion B of the shell also has an upwardly and rearwardly extending part $b^6$, terminating in a semicircular vertical flange $b^7$, about the top of which is an inwardly-projecting rib $b^8$. Said portion B also has a downwardly-extending part $b^9$, provided with a horizontal flange $b^a$ and extended slightly backward below said flange, as is clearly shown in Fig. 4, to form a beveled end adapted to engage the cup-holding plate next below. The front portion of the mill A has a central shell $a$, preferably corresponding in outline with the central plate $b$ of the portion B and adapted to rest against the same. Both portions have corresponding ears $x$, secured together by means of bolts $y$. A circular rib $b^c$ upon the rear plate $b$ holds the shell in position thereupon. Said shell is extended upward in the form of a semicylindrical portion $a'$, terminating in a semicylindrical flange $a^2$, having an inwardly-projecting rib $a^3$, said semicircular flange and rib corresponding to the similar portions $b^7$ $b^8$ upon the rear casting to form a socket for the lower end of the canister. The lower portion of the shell has a downward trough-like extension $a^4$, adapted to form, with the extension $b^9$ of the rear casting, a discharge-trough for the mill and bears a horizontal flange $a^5$, corresponding to $b^a$, upon the rear casting, and an extension below said flange, tapered forward, also to interlock with the plate below. The casting A has a central opening $a^6$, in which is journaled the shaft C of a bur $c$, opposed to the shell A, between which and itself the coffee is ground. A suitable handle D is secured upon the shaft, and said shaft is provided with a rearwardly-projecting hub $c'$, against which presses a plate E, secured to the rear casting at $e$ and pressed forward by means of an adjusting-screw F, threaded in said rear casting.

A canister G, preferably of glass and of cylindrical form, is provided with openings both at the top and bottom surrounded by vertical flanges, the flange $g$ at the top being preferably screw-threaded and fitted with a threaded cap H, by means of which a tight closure of the canister may be effected. The opening in the bottom is surrounded by a vertical flange $g'$, having an outwardly-projecting rib $g^2$ at the bottom, and said downwardly-projecting flange is secured within the circular opening in the top of the casing when the two parts of the casing are put together, an elastic washer I being interposed between the casing and the canister and between the ribs $b^8$ $g^2$. A groove $b^e$ $a^7$ below the ribs $b^8$ $a^3$ is adapted to receive the rib $g^2$ upon the canister and furnish a bearing therefor upon the side opposite the elastic washer I. A cup-holding plate K, provided with a raised central portion $k$, containing an opening $k'$, is secured to the casing, when the latter is put together, by means of the oppositely-beveled downward extensions $b^9 a^4$, which may be inserted in said plate by spreading the upper portions of the casing apart. Said cup-holding plate is preferably circular in shape and provided with laterally-projecting ears $k^2 k^3$, threaded to receive screws $k^4 k^5$, by means of which elastic beveled washers $k^6 k^7$ are fastened to the plate, said washers having their larger ends downward in order to engage a beveled flange $m$ upon a cup M, adapted to receive the ground coffee. A tongue $m'$ upon the rear side of the plate acts as a stop to limit the backward movement of the cup when the same has been placed directly beneath the plate. The cup M is preferably of glass and is shown as vertically graduated at $m^2$ to assist in accurately determining the quantity of the contents. The cup may be easily inserted or removed from beneath the plate, where it is held in place by the elasticity of the beveled rubber washers.

The transparent glass canister is intended to be of sufficient size to contain a considerable supply of coffee, so that it does not require frequent filling. In this way the strength of the coffee is saved. There is no necessity for opening the canister except for refilling, as the contents can be easily seen through the glass jar and the amount of coffee therein determined at any time at a glance. Whenever coffee is required for use, the operator simply turns the handle until the required amount is seen in the glass cup at the bottom. Said cup is then removed for an instant for the purpose of emptying it and immediately replaced to effect an air-tight closure of the bottom of the mill. Escape of the strength of the coffee from the bottom is therefore prevented.

The exceeding simplicity of the operation of the various parts of the mill and the increased convenience and saving of work render it desirable outside of its pleasing appearance and neatness in form and construction. The work required to care for coffee is reduced to the minimum, comprising, as it does, merely the emptying of the coffee when bought into the canister, the necessary turns of the handle when the coffee is wanted, and the emptying of the ground contents of the cup at the bottom.

The various parts of the mill are capable of more or less modification in form, construction, and arrangement, and I therefore do not limit myself to the specific details shown and described; but

I claim as new and desire to secure by Letters Patent—

1. The combination with a cup having an outwardly-projecting rib at the top, of a cup-holding plate provided with downwardly-projecting elastic washers adapted to engage the bottom of the rib and hold the cup tightly to the plate; substantially as described.

2. The combination with a cup having an outwardly-projecting rib at the top, of a cup-holding plate provided with a rear stop and lateral downwardly-projecting elastic washers adapted to engage the bottom of the rib and hold the cup tightly to the plate when in contact with said stop; substantially as described.

3. In a coffee-mill, the combination with a suitable bur, of a casing made up of a shell and a vertical back plate therefor, said back plate being provided with rearwardly-projecting legs adapted for attachment to a support, said shell and casing being provided with upwardly-projecting symmetrical semicylindrical flanges with inwardly-projecting ribs at the top forming between them a circular canister-supporting opening, said shell and plate also having downwardly-projecting portions forming a discharge-trough flared outward at the bottom, a canister fitted to the top of the casing, a cup-holding plate having an opening fitted to the flaring end of the trough and adapted to be securely fastened thereon when the parts of the casing are brought together and a cup provided with means for securing it to the plate; substantially as described.

In witness whereof I have hereunto set my hand, at Freeport, in the county of Stephenson and State of Illinois, this 28th day of June, A. D. 1899.

CHARLES MORGAN.

Witnesses:
T. E. BORDEKER,
CHAS. DEMETER.